(12) United States Patent
Wolfe et al.

(10) Patent No.: US 8,587,240 B2
(45) Date of Patent: Nov. 19, 2013

(54) OPERATIONALLY DEPENDENT FILTERING FOR SOFT STARTER CURRENT MEASUREMENTS

(75) Inventors: Robert Thomas Wolfe, Brookfield, WI (US); Steven A. Dimino, Wauwatosa, WI (US)

(73) Assignee: Eaton Corporation, Cleveland, OH (US)

( * ) Notice: Subject to any disclaimer, the term of this patent is extended or adjusted under 35 U.S.C. 154(b) by 216 days.

(21) Appl. No.: 13/186,677

(22) Filed: Jul. 20, 2011

(65) Prior Publication Data

US 2013/0020975 A1    Jan. 24, 2013

(51) Int. Cl.
*H02P 1/00* (2006.01)

(52) U.S. Cl.
USPC ............. 318/430; 318/432; 318/400.19

(58) Field of Classification Search
USPC ............ 318/430, 432, 461, 772, 799, 400.19; 341/176; 700/83
See application file for complete search history.

(56) References Cited

U.S. PATENT DOCUMENTS

| | | | |
|---|---|---|---|
| 3,452,264 A | 6/1969 | Turtle | |
| 4,843,295 A | 6/1989 | Thompson et al. | |
| 5,731,682 A | 3/1998 | Yamakawa | |
| 5,847,555 A * | 12/1998 | Lewis | 323/299 |
| 6,160,365 A * | 12/2000 | Younger et al. | 318/16 |
| 6,163,129 A * | 12/2000 | Younger et al. | 318/799 |
| 6,445,332 B1 * | 9/2002 | Younger et al. | 341/176 |
| 6,445,966 B1 * | 9/2002 | Younger et al. | 700/83 |
| 6,594,592 B1 | 7/2003 | Griepentrog et al. | |
| 6,605,918 B2 | 8/2003 | Mayhew et al. | |
| 6,621,291 B2 * | 9/2003 | Lee et al. | 324/765.01 |
| 7,038,423 B2 | 5/2006 | Reed et al. | |
| 7,149,064 B2 * | 12/2006 | Nolden et al. | 361/23 |
| 7,227,326 B1 * | 6/2007 | Lu et al. | 318/461 |

(Continued)

FOREIGN PATENT DOCUMENTS

| | | |
|---|---|---|
| CN | 2624520 Y | 7/2004 |
| CN | 2805215 Y | 8/2006 |

(Continued)

OTHER PUBLICATIONS

Yamada et al., "A New Method of Compensating Harmonic Currents for Wind Power Generation Systems with the Soft Starter Using a Hybrid Active Filter," IEEE, 2007, pp. 404-409.

(Continued)

*Primary Examiner* — Paul Ip
(74) *Attorney, Agent, or Firm* — Ziolkowski Patent Solutions Group, SC

(57) ABSTRACT

A system and method for optimizing current filtering in a motor soft starter is disclosed. A motor soft starter includes a circuit having an input connectable to an AC source and an output connectable to an input terminal of an AC motor, with the circuit being operable in a ramping mode and a bypass mode so as to control current flow and terminal voltages in the AC motor. The soft starter includes a controller connected to the circuit to control operation thereof, with the controller including a configurable current filter. The controller determines a current of an AC power provided to the input terminal of the AC motor from the soft starter, identifies a present operational mode of the soft starter as being one of the ramping mode and the bypass mode, and performs filtering on the determined current based on the present operational mode of the soft starter.

20 Claims, 3 Drawing Sheets

(56) References Cited

U.S. PATENT DOCUMENTS

| | | | |
|---|---|---|---|
| 7,282,887 B1* | 10/2007 | Williams | 318/778 |
| 7,298,105 B1* | 11/2007 | Lu et al. | 318/432 |
| 7,330,004 B2* | 2/2008 | DeJonge et al. | 318/244 |
| 7,414,377 B2 | 8/2008 | Mayhew et al. | |
| 7,459,877 B2 | 12/2008 | Cook | |
| 7,489,094 B2* | 2/2009 | Steiner et al. | 318/249 |
| 7,538,507 B2* | 5/2009 | Lu et al. | 318/461 |
| 7,671,549 B2* | 3/2010 | Steiner et al. | 318/249 |
| 7,952,318 B2* | 5/2011 | Lu et al. | 318/806 |
| 8,084,984 B2* | 12/2011 | Lu et al. | 318/800 |
| 2006/0273751 A1* | 12/2006 | DeJonge et al. | 318/772 |
| 2007/0114963 A1* | 5/2007 | Steiner et al. | 318/772 |
| 2007/0216337 A1* | 9/2007 | Lu et al. | 318/800 |
| 2007/0241700 A1* | 10/2007 | Williams | 318/254 |
| 2007/0247099 A1* | 10/2007 | Lu et al. | 318/461 |
| 2009/0051311 A1* | 2/2009 | Lu et al. | 318/806 |
| 2009/0072775 A1* | 3/2009 | Steiner et al. | 318/400.19 |
| 2010/0109597 A1* | 5/2010 | Steiner et al. | 318/772 |
| 2010/0156338 A1* | 6/2010 | Lu et al. | 318/798 |
| 2011/0006709 A1 | 1/2011 | Naiman | |
| 2011/0050155 A1* | 3/2011 | Balcon et al. | 318/778 |
| 2011/0309805 A1* | 12/2011 | Matveev et al. | 322/61 |

FOREIGN PATENT DOCUMENTS

| | | |
|---|---|---|
| CN | 101232236 A | 7/2008 |
| CN | 201294475 Y | 8/2009 |
| CN | 201328095 Y | 10/2009 |
| CN | 201414101 Y | 2/2010 |
| CN | 201414102 Y | 2/2010 |
| CN | 201479065 U | 5/2010 |
| CN | 101814873 A | 8/2010 |
| CN | 201690395 U | 12/2010 |
| EP | 0347702 A1 | 12/1989 |
| JP | 55-029278 A | 3/1980 |
| WO | 02059628 A1 | 8/2002 |

OTHER PUBLICATIONS

Bhuvaneswari et al., "Power Quality Studies on a Soft-Start for an Induction Motor," IEEE, 2008, pp. 1-6.

* cited by examiner

OPERATIONALLY DEPENDENT FILTERING FOR SOFT STARTER CURRENT MEASUREMENTS

BACKGROUND OF THE INVENTION

The present invention relates generally to alternating current (AC) motors and, more particularly, to a system and method for optimizing current filtering in a motor soft starter.

Motor soft starters are devices that control transmission of voltage and current from an AC power source to an induction motor. Soft starters are configured to limit the transient voltages and current to the induction motor 40 during start-up, resulting in a "soft" motor starting. In operation, power from the AC source is passed through switching devices in the soft starter, such as a pair of anti-parallel solid-state switches in the form of silicon controlled rectifiers (SCRs), to control the current flow and, in turn, the terminal voltages of the induction motor.

It is recognized that current measurements are a key to soft starter control and operation, and are the basis for many control and protection algorithms. It is also recognized that filtering is performed on the current measurements as a way to attenuate noise and more accurately represent the true system current characteristics. However, the level of filtering that occurs must be balanced with the dynamic requirements of the soft starter and its ability to respond quickly and appropriately.

The noise present on soft starter current measurements is typically higher in frequency than the actual current signal itself. As such, low pass filtering is performed to attenuate higher frequency content. However, the greater the reduction in the higher frequency content, the slower the current measurement will reflect actual changes. Thus the soft starter operation is characterized according to how often current is expected to change and how quickly those changes need to seen by the internal control. Soft starter current characteristics change depending on what mode of operation the soft starter is in. For ramp-up/start-up scenarios, the current is changing quickly as the system responds to the motor start dynamics, and the soft starter operates in a start-up mode using the SCRs as switching devices. After the motor has started, changes in current are less frequent, and the soft starter operates in a bypass mode such that AC power is transferred to the induction motor via a contactor that bypasses the SCRs.

Existing technology does not differentiate between soft starter operational modes for current filtering, nor employ an associated adjustment to the filter parameters. The current filtering is thus static across each mode of operation.

It would therefore be desirable to design current filtering for the soft starter that can take into account these different expected conditions, and optimize the current filtering accordingly. It would also be desirable for such current filtering to optimize noise removal and more quickly correlate the current measurement to actual changes.

BRIEF DESCRIPTION OF THE INVENTION

The present invention provides a system and method for optimizing current filtering in a motor soft starter.

In accordance with one aspect of the present invention, a motor soft starter includes a circuit having an input connectable to an AC source and an output connectable to an input terminal of an AC motor, with the circuit including at least one contactor and at least one switch that provide for operation of the soft starter in one of a ramping mode and a bypass mode so as to control current flow and terminal voltages in the AC motor. The soft starter also includes a controller connected to the circuit to control operation thereof, with the controller including a configurable current filter. The controller is configured to determine a current of an AC power provided to the input terminal of the AC motor from the soft starter, identify a present operational mode of the soft starter, the present operational mode being one of the ramping mode and the bypass mode, and perform filtering on the determined current based on the present operational mode of the soft starter.

In accordance with another aspect of the invention, a method for operationally dependent filtering of motor soft starter current measurements is provided. The method includes the step of providing a soft-starter in series between an AC power source and a multi-phase AC motor, with the soft-starter comprising a plurality of switching devices and plurality of contactors to condition voltage and current to the multi-phase AC motor. The method also includes the steps of determining a current provided from the soft starter to the multi-phase AC motor, performing an operationally dependent filtering of the determined current based on an operational mode of the soft starter so as to generate a filtered output current value, and controlling operation of the soft starter based, at least in part, on the filtered output current value. The performing of the operationally dependent filtering further includes determining the operational mode of the soft starter as being one of at least a first operational mode and a second operational mode, filtering the measured current according to a first filter setting if the soft starter is in the first operational mode, or otherwise, filtering the measured current according to a second filter setting if the soft starter is in the second operational mode.

In accordance with yet another aspect of the invention, a soft starter to control transmission of voltage and current from an AC power source to an AC motor includes a plurality of supply lines corresponding to phases in the induction motor and at least one solid-state switch and contactor located on each of the plurality of supply lines to condition a motor line voltage and a phase current to the AC motor. The soft starter also includes a controller programmed to measure a current of an AC power provided to the input terminal of the Induction motor from the soft starter, determine if the soft starter is currently operating in a ramping mode or a bypass mode, cause the measured current to be filtered at a first filter setting if the soft starter is operating in the ramping mode, and cause the measured current to be filtered at a second filter setting if the soft starter is operating in the bypass mode, with the second filter setting being configured to provide increased high frequency filtering as compared to the first filter setting.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to a system and method for optimizing current filtering in a motor soft starter.

Figure 1:
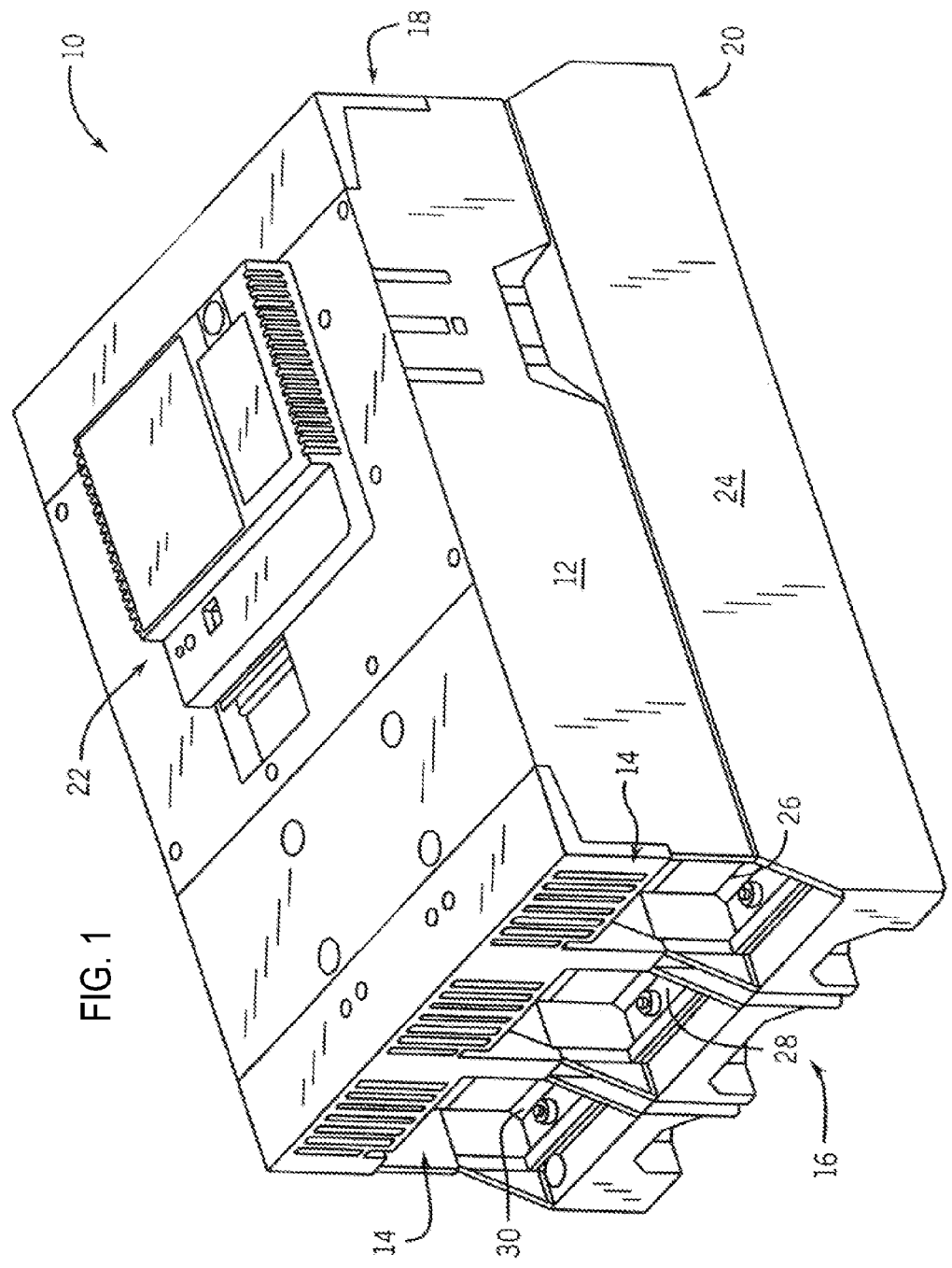
FIG. 1 is a perspective view of a soft starter for use with embodiments of the present invention.

Referring to FIG. 1, a soft starter 10 is shown that can be used in implementing embodiments of the invention set forth below. The soft starter 10 includes a cover assembly 12 having air inlets 14 on a motor connection end, or load end 16. Similar air outlets 18 are located on a power source end, or line end 20 of the soft starter 10. The cover assembly 12 also houses an electronic controller 22. Soft starter 10 also includes a base assembly 24 to house each of switch assemblies 26, 28, 30. Each of the switch assemblies 26-30 is identical in construction for a given soft starter 10 and corresponds to a phase of a multi-phase input to a multi-phase AC motor.

It is recognized that soft starter 10 is merely an example of a soft starter architecture/structure that may used in implementing embodiments of the invention, and that other various soft starter architectures/structures used or required to meet specific application requirements are also understood to be included within the scope of the invention. For example, a range of open chassis soft starter configurations could be used in implementing embodiments of the invention rather than the housed soft starter shown in FIG. 1.

Figure 2:
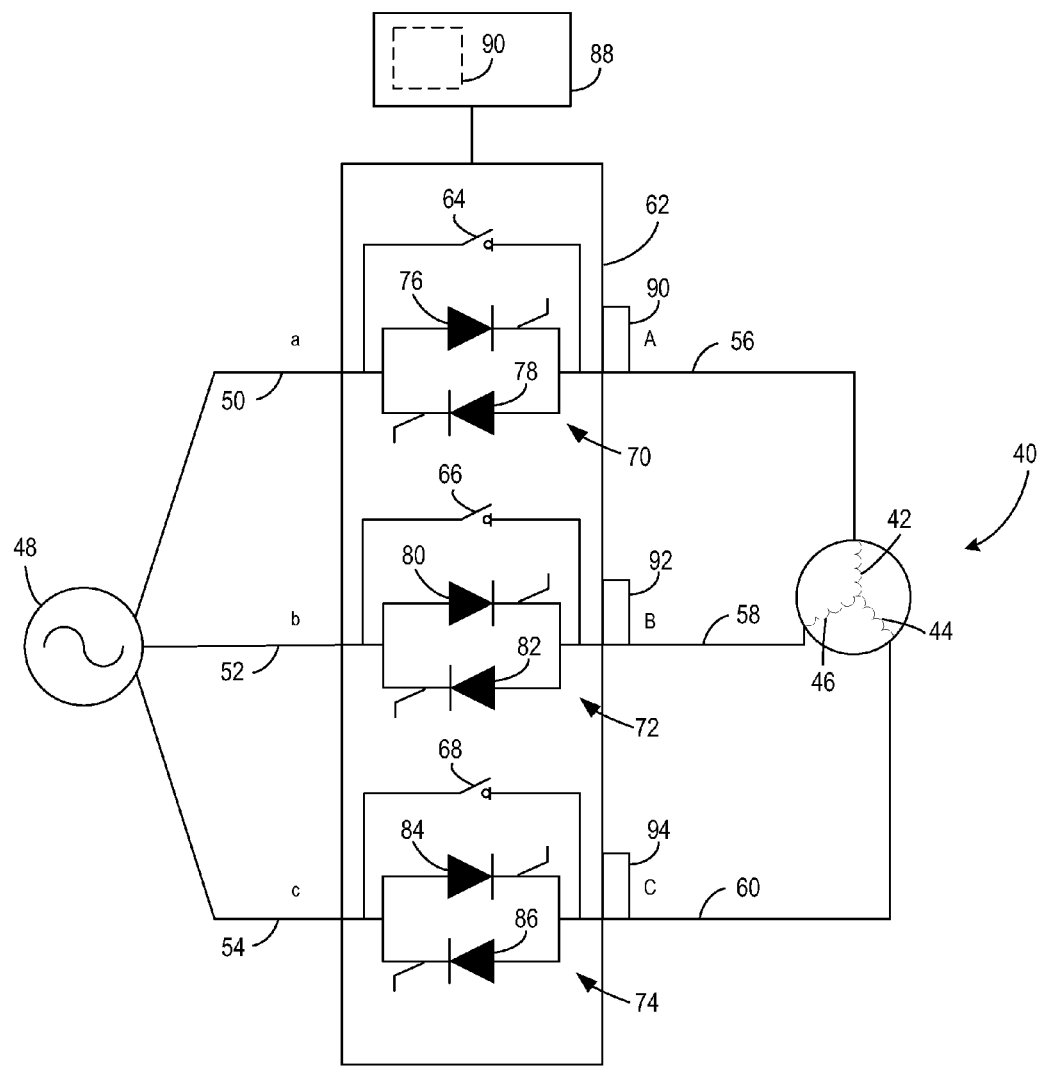
FIG. 2 is a schematic view of an AC motor system incorporating a soft starter according to an embodiment of the invention.

Referring to FIG. 2, a three-phase, AC motor is schematically shown according to an embodiment of the invention, and is generally designated by the reference numeral 40. As is conventional, AC motor 40 is represented as three windings 42, 44, 46. In this case, AC motor is shown connected in a wye-arrangement. It can be appreciated that AC motor may alternatively, and according to the equivalents of the invention, be connected in a delta arrangement without deviating from the scope of the invention. Stator windings 42-46 of AC motor 40 are operatively connected to an AC power source 48 through corresponding multi-phase supply lines 50, 52, 54, at motor terminals 56, 58, 60.

As shown in FIG. 2, a soft starter 62 is connected between AC source 48 and AC motor 40. The soft starter is configured to limit the transient voltages and current to AC motor 40 during start-up, resulting in a "soft" motor starting. The basic structure of soft starter 62 is shown in FIG. 2 (i.e., circuitry of the soft starter) as including a contactor 64, 66, 68 corresponding to each supply line 50-54 or each phase of the supply power. Soft starter 62 also includes a switching device 70, 72, 74 on each supply line 50-54. In an exemplary embodiment each switching device 70-74 is formed of a pair of anti-parallel switches, such as solid-state switches in the form of silicon controlled rectifiers (SCRs) or thyristors, to control the current flow and, in turn, the terminal voltages of the motor 40. That is, SCR pair 70 includes SCRs 76, 78, which are opposite in polarity and are connected in parallel for supply line 50. Likewise, SCR pair 72 includes SCRs 80, 82, which are opposite in polarity and are connected in parallel for supply line 52. Finally, SCR pair 74 includes SCRs 84, 86, which are opposite in polarity and are connected in parallel for supply line 54. In a preferred embodiment, SCRs 76, 80, 84 are forward conducting and SCRs 78, 82, 86 are backward conducting. It is recognized that, for a specified supply line, an SCR could be arranged in parallel with a diode rather than another SCR given the end use of the device.

Also included in soft starter 62 is a controller or processor 88 configured to control operation of SCRs 76-86 via the transmission of gate drive signals thereto, as well as to control opening and closing of contactors 64-68. During start-up/ ramp-up of AC motor 40 (and similarly during a ramp-down), soft starter 62 operates in a "start-up" or "SCR" mode, during which controller 88 causes one or more of contactors 64-68 corresponding to supply lines 50-54 to open such that the power from AC source 48 passes through SCR pairs 70-74, thus controlling the current flow (and therefore the voltage) applied to the AC motor 40. Subsequent to start-up of AC motor 40, the soft starter 62 enters a "bypass" mode in which controller 88 causes the contactor 64-68 on each supply line 50-54 to close, so as to bypass the switching devices 70, 72, 74 and minimize power dissipation. The bypass mode thus is considered the "normal" mode of operation for the soft starter 62 and AC motor 40.

During operation of soft starter 62, ongoing processing occurs within the soft starter in which measurements and/or calculations of the current being drawn by AC motor 40 are performed at approximately every half cycle of the input line frequency. Such current calculations are accompanied by a filtering of the current measurements, with the filtering acting as a way to attenuate noise and more accurately represent the true system current characteristics. According to one embodiment of the invention, such a current calculation and filtering operation can be performed by a current filter 90 incorporated into controller 88 of soft starter 62, for example. Alternatively, a current filter 90 could be provided as part of a separate, stand-alone computational device. The measured/calculated current is thus filtered by current filter 90 before subsequent reading and processing of the current data by controller 88, such as a reading by an analog to digital converter in a digital signal processor (not shown) of controller 88.

To optimize operation of the soft starter 62, the level of filtering that occurs should be balanced with the dynamic requirements of the soft starter and its ability to respond quickly and appropriately. The noise present on soft starter current measurements is typically higher in frequency than the actual current signal itself, so low pass filtering is performed to attenuate higher frequency content. However, the greater the reduction in the higher frequency content, the slower the current measurement will reflect actual changes in current. As such, the current filtering would ideally be characterized according to how often current is expected to change, and how quickly those changes need to seen by the controller.

Accordingly, current filter 90 is in the form of a configurable filter, with an optimal filter configuration being determined based on a present operational mode of soft starter 62. That is, the configuration of current filter 90 is determined based on whether soft starter 62 is operating in the SCR/ ramping mode or in the bypass mode. In configuring the current filter 90, the controller 88 assigns coefficients in the filter 90 based on the determined soft starter operational mode. For a SCR/ramping mode, with current flow being controlled by the SCRs, the current is changing quickly as the soft starter 62 responds to the motor start dynamics. However, after the AC motor 40 has started and is connected to the AC power source 48 in bypass, changes in current are less frequent. So the current filtering for the soft starter 62 can take into account these different expected conditions, and optimize accordingly. Specifically, when in SCR mode, current filter 90 is operated/configured as an SCR filter that is a "quicker" filter for current filtering, with less high frequency attention, which allows the soft starter 62 to see changes in the system quickly, as required for successful SCR/ramping control. When in bypass mode, the current filter 90 is operated/configured as a bypass filter that is a stronger filter with increased high frequency filtering, which provides for increased noise removal and results in a smoother metering display of current to the user, with less toggling of the least significant digit.

Figure 3:
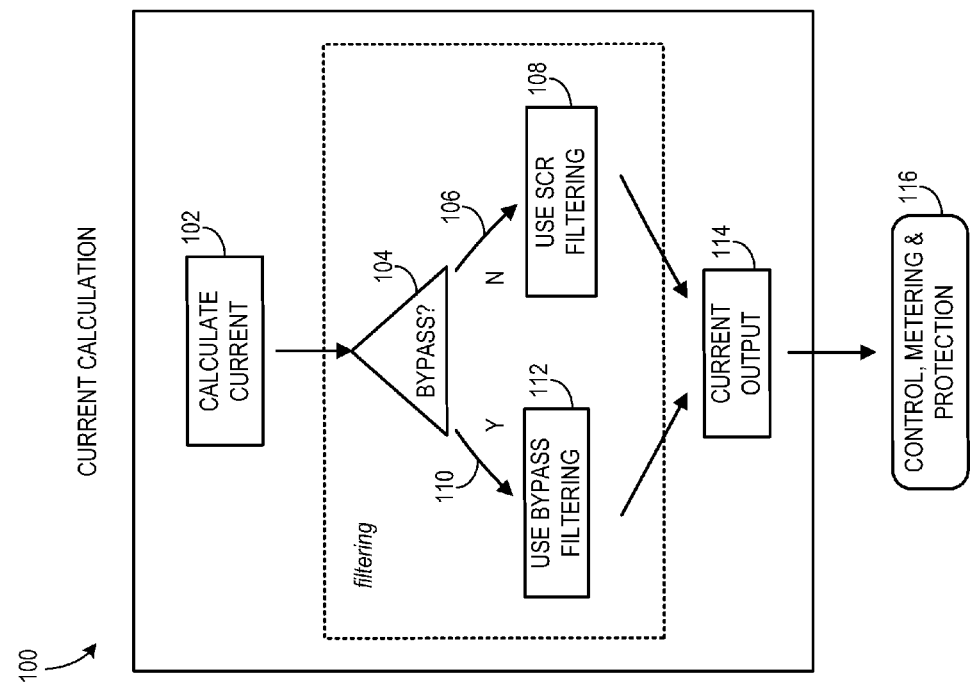
FIG. 3 is a flowchart illustrating a technique for optimizing current filtering in a soft starter according to an embodiment of the invention.

A technique 100 for performing the current calculation and filtering operation is illustrated in FIG. 3, according to an embodiment of the invention. Technique 100 begins with the measuring and calculation of current being drawn by AC motor/output by the soft starter at STEP 102. In an exemplary embodiment, a root mean square (RMS) calculation is performed on a measured 3-phase current, for example, although it is recognized other manners of calculating the current could also be employed. As shown in FIG. 3, the filtering mode is then determined based on whether the soft starter is operating in the SCR mode or the bypass mode. At STEP 104, a determination is made as to whether the soft starter is currently operating in the bypass mode. If the soft starter is determined not to be operating in the bypass mode 106 (i.e., soft starter is in SCR mode), then technique continues at STEP 108, where filtering is performed using a "SCR filter" setting or configuration. The SCR filtering is characterized as a "quicker" filter that performs less high frequency filtering, which allows the soft starter to see current changes in the system quickly, as required for successful start-up/ramp control.

If the soft starter is determined to be operating in the bypass mode 110, then technique continues at STEP 112, where filtering is performed using a "bypass filter" setting or configuration. The bypass filtering is characterized as stronger filter with increased high frequency filtering, resulting in the increased removal of noise that results in smoother metering display of current to the user, with less toggling of the least significant digit.

It is recognized that the filtering provided in the SCR filtering setting/mode is a "weaker" filtering (i.e., a decreased high frequency filtering) that removes less noise than the bypass filtering mode, resulting in a rougher metering display of current. However, during SCR operation, such noise removal is less of a concern, as it is masked by rapid changes in the current. Similarly, it is recognized that the filtering provided in the bypass filtering setting/mode is a "slower" filter, with output that reflects current changes in the system slower than the SCR filtering mode based on the increased high frequency filtering being performed. However, during bypass operation, such response to current changes in the system is less of a concern, as there is little need for dynamic control when operating in the bypass mode. Thus, the selective performing of current filtering in the SCR and bypass settings/modes provides for optimized current filtering in the soft starter.

Once the current has been filtered, using the applicable operationally dependent parameters, a filtered current is output at STEP 114. The filtered current output is then provided for control, metering, and protection functions of the soft starter, as shown at STEP 116. For example, the control functions performed at STEP 116 can include controlling operation of the soft starter and its operation in one of the ramping mode and the bypass mode. Thus, control of the contactors 64-68 and switching devices 70-74 (shown in FIG. 2) for operating the soft starter in ramping mode or bypass mode can be determined/based, at least in part, on the filtered current output at STEP 114.

Figure 4:
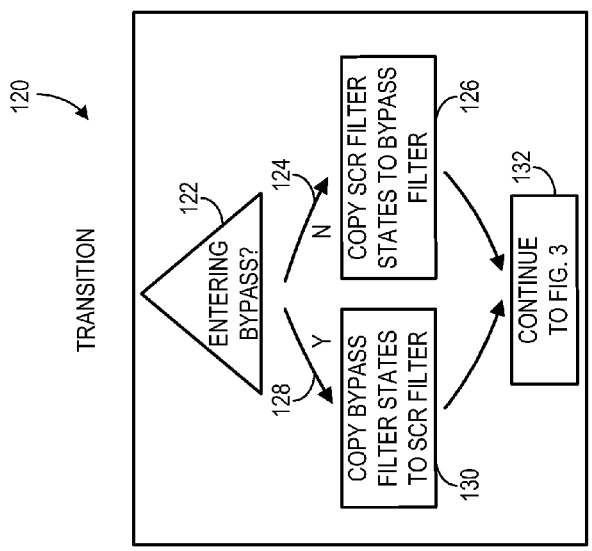
FIG. 4 is a flowchart illustrating a technique for modifying current filtering during transitioning between soft starter operational modes according to an embodiment of the invention.

Referring now to FIG. 4, a technique 120 is illustrated that provides the transitional logic required for the operationally dependent filtering approach illustrated in FIG. 3. Specifically, the technique 120 of FIG. 4 illustrates that when transitioning from SCR mode to bypass mode during a ramp-up, or vice versa from bypass mode to SCR mode during a ramp-down, the filter states (i.e., input history) used in the previous mode are transferred to the filter mode being entered. As shown in FIG. 4, a determination is made at STEP 122 as to whether the soft starter is entering into the bypass mode. If the soft starter is determined not to be entering into the bypass mode 124, but is instead transitioning from bypass mode into SCR mode, then technique continues at STEP 126 where the filter states used in the bypass mode are transferred to the SCR filter configuration. Conversely, if the soft starter is determined at STEP 122 to be entering into the bypass mode 128, then technique continues at STEP 130 where the filter states used in the SCR mode are transferred to the bypass filter.

By copying filter states from the previous operation mode during transition into the next operational mode, the new filter states reflect the most recent system conditions, allowing for a seamless transition of the filtering and resulting output. Of note is that the technique/process that provides the transitional logic only effects the filter states (i.e., input history), and not the filter coefficient used to produce the intended filtering effect.

Referring still to FIG. 4, upon the copying of the SCR or bypass states to the current filter when transitioning from SCR to bypass or from bypass to SCR, the technique 120 implements a continuation step, illustrated by STEP 132, where the technique 100 of FIG. 3 is run once the transition between modes is completed and the present mode is entered into.

Beneficially, embodiments of the invention thus provide a soft starter, and method of controlling thereof, that balances the dynamic requirements of the soft starter and its ability to respond quickly and appropriately with the level of current filtering that is provided by current filter 90. The controller 88 implements operationally dependent current filtering in which current filter 90 is operated/configured based on an identified operating mode of soft starter 10. That is, current filter 90 is operated/configured as an SCR filter during the ramping mode of operation such that it functions as a quicker filter for current filtering, with less high frequency attention, and current filter 90 is operated/configured as a bypass filter during the bypass mode of operation such that it functions as a stronger filter with increased high frequency filtering.

A technical contribution for the disclosed method and apparatus is that it provides for a controller-implemented technique for optimizing current filtering in a soft starter. The technique controls the amount and type of filtering performed on a measured/determined current based on the operational mode of the soft starter, so as to balance the dynamic requirements of the soft starter and its ability to respond quickly and appropriately with the level of current filtering that is provided.

Therefore, according to one embodiment of the present invention, a motor soft starter includes a circuit having an input connectable to an AC source and an output connectable to an input terminal of an AC motor, with the circuit including at least one contactor and at least one switch that provide for operation of the soft starter in one of a ramping mode and a bypass mode so as to control current flow and terminal voltages in the AC motor. The soft starter also includes a controller connected to the circuit to control operation thereof, with the controller including a configurable current filter. The controller is configured to determine a current of an AC power provided to the input terminal of the AC motor from the soft starter, identify a present operational mode of the soft starter, the present operational mode being one of the ramping mode and the bypass mode, and perform filtering on the determined current based on the present operational mode of the soft starter.

According to another embodiment of the present invention, a method for operationally dependent filtering of motor soft starter current measurements is provided. The method includes the step of providing a soft-starter in series between an AC power source and a multi-phase AC motor, with the soft-starter comprising a plurality of switching devices and plurality of contactors to condition voltage and current to the multi-phase AC motor. The method also includes the steps of determining a current provided from the soft starter to the multi-phase AC motor, performing an operationally dependent filtering of the determined current based on an operational mode of the soft starter so as to generate a filtered output current value, and controlling operation of the soft starter based, at least in part, on the filtered output current value. The performing of the operationally dependent filtering further includes determining the operational mode of the soft starter as being one of at least a first operational mode and a second operational mode, filtering the measured current according to a first filter setting if the soft starter is in the first operational mode, or otherwise, filtering the measured current according to a second filter setting if the soft starter is in the second operational mode.

According to yet another embodiment of the present invention, a soft starter to control transmission of voltage and current from an AC power source to an AC motor includes a plurality of supply lines corresponding to phases in the induction motor and at least one solid-state switch and contactor located on each of the plurality of supply lines to condition a motor line voltage and a phase current to the AC motor. The soft starter also includes a controller programmed to measure a current of an AC power provided to the input terminal of the Induction motor from the soft starter, determine if the soft starter is currently operating in a ramping mode or a bypass mode, cause the measured current to be filtered at a first filter setting if the soft starter is operating in the ramping mode, and cause the measured current to be filtered at a second filter setting if the soft starter is operating in the bypass mode, with the second filter setting being configured to provide increased high frequency filtering as compared to the first filter setting.

The present invention has been described in terms of the preferred embodiment, and it is recognized that equivalents, alternatives, and modifications, aside from those expressly stated, are possible and within the scope of the appending claims.

What is claimed is:

1. A motor soft starter comprising:
   a circuit having an input connectable to an AC source and an output connectable to an input terminal of an AC motor, the circuit including at least one contactor and at least one switch that provide for operation of the soft starter in one of a ramping mode and a bypass mode so as to control current flow and terminal voltages in the AC motor; and
   a controller connected to the circuit to control operation thereof and comprising a configurable current filter, the controller configured to:
   determine a current of an AC power provided to the input terminal of the AC motor from the soft starter;
   identify a present operational mode of the soft starter, the present operational mode being one of the ramping mode and the bypass mode; and
   perform filtering on the determined current based on the present operational mode of the soft starter.

2. The motor soft starter of claim 1 wherein the output comprises a plurality of supply lines and the AC motor comprises a multi-phase AC motor, with each supply line corresponding to a phase in the AC motor; and
   wherein the at least one contactor and the at least one switch comprises a pair of solid-state switches and a contactor corresponding to each supply line.

3. The motor soft starter of claim 2 wherein each pair of solid-state switches comprises a pair of silicon controlled rectifiers (SCRs) in an anti-parallel arrangement.

4. The motor soft starter of claim 2 wherein the controller is configured to:
   measure the current on each of the plurality of supply lines; and
   calculate the root mean square (RMS) value of the current measured on the plurality of supply lines.

5. The motor soft starter of claim 1 wherein the controller is configured to:
   filter the determined current at a first filter setting when the soft starter is operating in the ramping mode; and
   filter the determined current at a second filter setting when the soft starter is operating in the bypass mode.

6. The motor soft starter of claim 5 wherein the first filter setting performs less high frequency filtering than the second filter setting.

7. The motor soft starter of claim 5 wherein the controller is enabled to more quickly respond to changes in current levels at the first filter setting as compared to the second filter setting.

8. The motor soft starter of claim 5 wherein the configurable current filter includes a plurality of filter coefficients that are set based on the present operational mode of the soft starter, with the filter coefficients being varied between the first filter setting and the second filter setting.

9. The motor soft starter of claim 5 wherein the controller is configured to copy filter states from the first filter setting to the second filter setting when the soft starter is transitioning from the ramping mode to the bypass mode and copy filter states from the second filter setting to the first filter setting when the soft starter is transitioning from the bypass mode to the ramping mode.

10. The motor soft starter of claim 1 wherein the power from the AC source is routed through the at least one switching device when in the ramping mode and the power is routed through the at least one contactor when in the bypass mode.

11. A method for operationally dependent filtering of motor soft starter current measurements, the method comprising:
    providing a soft-starter in series between an AC power source and a multi-phase AC motor, the soft-starter comprising a plurality of switching devices and plurality of contactors to condition voltage and current to the multi-phase AC motor;
    determining a current provided from the soft starter to the multi-phase AC motor;
    performing an operationally dependent filtering of the determined current based on an operational mode of the soft starter so as to generate a filtered output current value; and
    controlling operation of the soft starter based, at least in part, on the filtered output current value;
    wherein performing the operationally dependent filtering comprises:

determining the operational mode of the soft starter, the operational mode comprising one of at least a first operational mode and a second operational mode;

filtering the measured current according to a first filter setting if the soft starter is in the first operational mode;

otherwise, filtering the measured current according to a second filter setting if the soft starter is in the second operational mode.

12. The method of claim 11 wherein the first operational mode comprises a ramping mode in which power from the AC power source is routed through the plurality of switching devices and the second operational mode comprises a bypass mode in which power from the AC power source is routed through the plurality of contactors.

13. The method of claim 11 wherein the second filter setting is configured to provide increased high frequency filtering as compared to the second filter setting, such that the second filter setting removes more noise from the determined current than the first current setting and such that the first filter setting provides a more dynamic response to changes in current than the second filter setting.

14. The method of claim 11 wherein performing the operationally dependent filtering further comprises copying filter states from the first filter setting to the second filter setting when the soft starter is transitioning from the first operational mode to the second operational mode and copying filter states from the second filter setting to the first filter setting when the soft starter is transitioning from the second operational mode to the first operational mode.

15. The method of claim 11 wherein determining the current comprises:

measuring the current on each phase of the multi-phase AC motor; and calculating the root mean square (RMS) value of the currents measured on the phases of the multi-phase AC motor.

16. A soft starter to control transmission of voltage and current from an AC power source to an AC motor, the soft starter comprising:

a plurality of supply lines, each supply line corresponding to a phase in the induction motor;

at least one solid-state switch and contactor located on each of the plurality of supply lines to condition a motor line voltage and a phase current to the AC motor; and a controller programmed to:

measure a current of an AC power provided to the input terminal of the Induction motor from the soft starter;

determine if the soft starter is currently operating in a ramping mode or a bypass mode;

cause the measured current to be filtered at a first filter setting if the soft starter is operating in the ramping mode; and cause the measured current to be filtered at a second filter setting if the soft starter is operating in the bypass mode;

wherein the second filter setting is configured to provide increased high frequency filtering as compared to the first filter setting.

17. The soft starter of claim 16 wherein the controller is further programmed to copy a current input history from the first filter setting to the second filter setting when the soft starter is transitioning from the ramping mode to the bypass mode and copy a current input history from the second filter setting to the first filter setting when the soft starter is transitioning from the bypass mode to the ramping mode.

18. The soft starter of claim 16 wherein the controller is further programmed to more quickly respond to changes in current levels at the first filter setting as compared to the second filter setting.

19. The soft starter of claim 16 wherein the controller is further programmed to perform control, metering, and protection functions of the soft starter based, at least in part, on the filtered current.

20. The soft starter of claim 16 wherein the power from the AC power source is routed through the switching devices when in the ramping mode and the power is routed through the contactors when in the bypass mode.

* * * * *